(12) United States Patent
Amundson et al.

(10) Patent No.: US 6,819,471 B2
(45) Date of Patent: Nov. 16, 2004

(54) LIGHT MODULATION BY FRUSTRATION OF TOTAL INTERNAL REFLECTION

(75) Inventors: Karl R. Amundson, Cambridge, MA (US); Guy M. Danner, Somerville, MA (US); Gregg M. Duthaler, Needham, MA (US); Russell J. Wilcox, Natick, MA (US)

(73) Assignee: E Ink Corporation, Cambridge, MA (US)

(*) Notice: Subject to any disclaimer, the term of this patent is extended or adjusted under 35 U.S.C. 154(b) by 79 days.

(21) Appl. No.: 10/064,779

(22) Filed: Aug. 16, 2002

(65) Prior Publication Data

US 2003/0038755 A1 Feb. 27, 2003

Related U.S. Application Data

(60) Provisional application No. 60/312,963, filed on Aug. 16, 2001.

(51) Int. Cl.[7] .......................... G02B 26/00; G09G 3/34; G02F 1/1333; G03G 17/04
(52) U.S. Cl. ...................... 359/296; 359/290; 345/107; 349/86; 430/32
(58) Field of Search ................................. 359/238, 263, 359/245, 295, 296, 297; 345/107; 349/86; 430/32, 34, 35

(56) References Cited

U.S. PATENT DOCUMENTS

| | | | |
|---|---|---|---|
| 3,668,106 A | 6/1972 | Ota | 358/305 |
| 3,756,693 A | 9/1973 | Ota | 345/107 |
| 3,767,392 A | 10/1973 | Ota | 430/35 |

(List continued on next page.)

FOREIGN PATENT DOCUMENTS

| | | |
|---|---|---|
| EP | 1 024 394 A1 | 8/2000 |
| WO | WO 99/67678 | 12/1999 |
| WO | WO 00/05704 | 2/2000 |

(List continued on next page.)

OTHER PUBLICATIONS

U.S. patent application Ser. No. 09/650,620.
Amundson, K., et al., "Flexible, Active–Matrix Display Constructed Using a Microencapsulated Electrophoretic Material and an Organic–Semiconductor–Based Backplane", SID 01 Digest, 160 (Jun. 2001).
Antia, M., "Switchable Reflections Make Electronic Ink", Science, 285, 658 (1999).

(List continued on next page.)

*Primary Examiner*—Tim Thompson
(74) *Attorney, Agent, or Firm*—David J. Cole

(57) ABSTRACT

Improvements and modifications are provided in the type of frustrated total internal reflection electrophoretic systems described in U.S. Pat. No. 6,215,920. The improvements and modifications include (a) conforming the rear electrode to the shape of the front electrode; (b) encapsulating the electrophoretic medium and particles; (c) modifying the viscosity of the electrophoretic medium; (d) polymer coating the electrophoretic particles; (e) use of a high volume fraction of electrophoretic particles; (f) tethering the electrophoretic particles to the reflecting sheet; (g) using particles of varying electrophoretic mobility; (h) controlling the shape of the electrophoretic particles; (i) use of a low refractive index layer over the channel electrode; (j) providing cross-walls within the electrophoretic medium; (k) use of two immiscible liquids as the electrophoretic medium; and (l) replacing the electrophoretic particles with ones containing absorbing and/or scattering centers within a light transmissive matrix.

37 Claims, 3 Drawing Sheets

U.S. PATENT DOCUMENTS

| | | | |
|---|---|---|---|
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,324,456 A | 4/1982 | Dalisa | 350/362 |
| 4,336,536 A | 6/1982 | Kalt et al. | 340/783 |
| 4,606,611 A | 8/1986 | Fergason | 350/334 |
| 4,707,080 A | 11/1987 | Fergason | 350/334 |
| 4,726,662 A | 2/1988 | Cromack | 350/345 |
| 4,772,102 A | 9/1988 | Fergason et al. | 350/338 |
| 5,317,667 A | 5/1994 | Weber et al. | 385/147 |
| 5,582,700 A | 12/1996 | Bryning et al. | 204/450 |
| 5,673,148 A | 9/1997 | Morris et al. | 359/536 |
| 5,930,026 A | 7/1999 | Jacobson et al. | 359/256 |
| 5,959,777 A | 9/1999 | Whitehead | 359/618 |
| 5,961,804 A | 10/1999 | Jacobson et al. | 204/606 |
| 5,999,307 A | 12/1999 | Whitehead et al. | 359/298 |
| 6,014,247 A | 1/2000 | Winter et al. | 359/296 |
| 6,017,584 A | 1/2000 | Albert et al. | 427/313.3 |
| 6,064,784 A | 5/2000 | Whitehead et al. | 385/18 |
| 6,067,185 A | 5/2000 | Albert et al. | 359/296 |
| 6,067,774 A | 5/2000 | Sauer | 83/409 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,130,773 A | 10/2000 | Jacobson et al. | 359/296 |
| 6,130,774 A | 10/2000 | Albert et al. | 359/296 |
| 6,156,389 A * | 12/2000 | Brown et al. | 427/393.4 |
| 6,166,787 A | 12/2000 | Akins et al. | 349/57 |
| 6,177,921 B1 | 1/2001 | Comiskey et al. | 345/107 |
| 6,215,920 B1 | 4/2001 | Whitehead et al. | 385/18 |
| 6,225,971 B1 | 5/2001 | Gordon, II et al. | 345/107 |
| 6,232,950 B1 | 5/2001 | Albert et al. | 356/477 |
| 6,239,896 B1 | 5/2001 | Ikeda | 359/240 |
| 6,241,921 B1 * | 6/2001 | Jacobson et al. | 264/1.36 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,376,828 B1 | 4/2002 | Comiskey | 250/216 |
| 6,377,383 B1 | 4/2002 | Whitehead et al. | 359/222 |
| 6,377,387 B1 | 4/2002 | Duthaler et al. | 359/296 |
| 6,384,979 B1 * | 5/2002 | Whitehead et al. | 359/619 |
| 6,392,786 B1 | 5/2002 | Albert | 359/296 |
| 6,413,790 B1 | 7/2002 | Duthaler et al. | 438/21 |
| 6,445,489 B1 | 9/2002 | Jacobson et al. | 361/760 |
| 6,459,418 B1 | 10/2002 | Comiskey et al. | 345/107 |
| 6,473,072 B1 | 10/2002 | Comiskey et al. | 707/200 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,515,649 B1 | 2/2003 | Albert et al. | 345/107 |
| 6,518,949 B2 | 2/2003 | Drzaic | 345/107 |
| 6,525,865 B2 | 2/2003 | Katase | 359/296 |
| 6,531,997 B1 | 3/2003 | Gates et al. | 345/107 |
| 6,535,197 B1 | 3/2003 | Comiskey et al. | 345/107 |
| 6,538,801 B2 | 3/2003 | Jacobson et al. | 359/296 |
| 6,545,291 B1 | 4/2003 | Amundson et al. | 257/40 |
| 6,580,545 B2 | 6/2003 | Morrison et al. | 359/265 |
| 6,597,340 B1 | 7/2003 | Kawai | 345/107 |
| 2001/0030639 A1 | 10/2001 | Golden | 345/107 |
| 2001/0045934 A1 | 11/2001 | Turner et al. | 345/107 |
| 2002/0019081 A1 | 2/2002 | Denis et al. | 438/149 |
| 2002/0021270 A1 | 2/2002 | Albert | 345/84 |
| 2002/0053900 A1 | 5/2002 | Jacobson et al. | 324/100 |
| 2002/0060321 A1 | 5/2002 | Kazlas et al. | 257/66 |
| 2002/0063661 A1 | 5/2002 | Comiskey et al. | 345/55 |
| 2002/0063677 A1 | 5/2002 | Drzaic | |
| 2002/0075556 A1 | 6/2002 | Liang et al. | 359/296 |
| 2002/0090980 A1 | 7/2002 | Wilcox et al. | 455/566 |
| 2002/0106847 A1 | 8/2002 | Kazlas et al. | 438/200 |
| 2002/0113770 A1 | 8/2002 | Jacobson et al. | 345/107 |
| 2002/0130832 A1 | 9/2002 | Baucom et al. | 345/107 |
| 2002/0131147 A1 | 9/2002 | Paolini, Jr. et al. | 359/296 |
| 2002/0167480 A1 | 11/2002 | Johnson et al. | 345/107 |
| 2002/0171910 A1 | 11/2002 | Pullen et al. | 359/296 |
| 2002/0180687 A1 * | 12/2002 | Webber | 345/107 |
| 2002/0180688 A1 | 12/2002 | Drzaic et al. | 345/107 |
| 2002/0185378 A1 * | 12/2002 | Honeyman et al. | 204/601 |
| 2003/0011560 A1 | 1/2003 | Albert et al. | 345/107 |
| 2003/0011867 A1 | 1/2003 | Loxley | 359/296 |
| 2003/0011868 A1 | 1/2003 | Zehner et al. | 359/296 |
| 2003/0020844 A1 | 1/2003 | Albert et al. | 349/33 |
| 2003/0025855 A1 | 2/2003 | Homan et al. | 349/86 |
| 2003/0132908 A1 * | 7/2003 | Herb et al. | 345/107 |

FOREIGN PATENT DOCUMENTS

| | | |
|---|---|---|
| WO | WO 00/20922 | 4/2000 |
| WO | WO 00/26761 | 5/2000 |
| WO | WO 00/36560 | 6/2000 |
| WO | WO 00/38000 | 6/2000 |
| WO | WO 00/38001 | 6/2000 |
| WO | WO 00/67110 | 11/2000 |
| WO | WO 00/67327 | 11/2000 |
| WO | WO 01/07961 | 2/2001 |
| WO | WO 01/08241 | 2/2001 |

OTHER PUBLICATIONS

Chen, Y., et al., "A Conformable Electronic Ink Display using a Foil–Based a–Si TFT Array", SID 01 Digest, 157 (Jun. 2001).

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active–Matrix Color Displays Using Electrophoretic Ink and Color Filters", SID 02 Digest, 1374 (2002).

Jacobson, J., et al., "The last book", IBM Systems J., 36, 457 (1997).

Kazlas, P., et al., "12.1" SVGA Microencapsulated Electrophoretic Active Matrix Display for Information Applicances", SID 01 Digest, 152 (Jun. 2001).

Mossman, M.A., et al., "A New Reflective Color Display Technique Based on Total Internal Reflection and Substractive Color Filtering", SID 01 Digest, 1054 (2001).

Pitt, M.G., et al., "Power Consumption of Microencapsulated Electrophoretic Displays for Smart Handheld Applications", SID 02 Digest, 1378 (2002).

Webber, R., "Image Stability in Active–Matrix Microencapsulated Electrophoretic Displays", SID 02 Digest, 126 (2002).

* cited by examiner

LIGHT MODULATION BY FRUSTRATION OF TOTAL INTERNAL REFLECTION

CROSS REFERENCE TO RELATED APPLICATIONS

This application claims priority from Provisional Application Serial No. 60/312,963, filed Aug. 16, 2001. The entire contents of this provisional application are herein incorporated by reference.

BACKGROUND OF INVENTION

This invention relates to light modulation by frustration of total internal reflection. More specifically, this invention relates to a display in which total internal reflection at a surface is permitted or frustrated by moving electrophoretic particles relative to this surface.

The entire disclosures of all patents and patent applications mentioned hereinafter are incorporated herein by reference.

It has long been known that the transmission of light through an optical system can be modulated by causing the light to undergo total internal reflection at a surface within the system, and permitting or frustrating this total internal reflection by moving one or more members relative to the surface. The "members" moved relative to the surface can be electrophoretic particles suspended in a liquid and moved relative to the surface by an electric field. For example, U.S. Pat. No. 5,317,667, issued May 31, 1994, describes an electrophoretic switch for a light pipe. The light pipe is surrounded by two concentric cylindrical electrodes, the inner electrode being transparent. Between the electrodes is confined an electrophoretic medium comprising a plurality of charged particles in a suspending liquid. When the electrophoretic particles are spaced from the transparent inner electrode, total internal reflection (TIR) of the light passing along the light pipe occurs at this inner electrode, so that the full amount of light continues along the pipe. However, if an electric field is applied between the two electrodes so that the electrophoretic particles form a layer covering the inner electrode, TIR at this electrode is frustrated, and the flow of light along the pipe is substantially reduced or eliminated.

U.S. Pat. No. 6,215,920, issued Apr. 10, 2001 to Whitehead et al., describes a conceptually similar system (see FIG. 3 of this patent) in which TIR occurs at the interface between a solid light-transmitting member and an electrophoretic medium. The light transmitting member has a series of parallel V-shaped grooves or channels having 90° internal angles and having surfaces covered with a transparent electrode material. The opposed electrode has the form of a flat plate on the opposed side of a cavity within which the electrophoretic medium is confined. When the electrophoretic particles do not cover the surfaces of the channels, light enters through a planar surface of the light-transmitting member remote from the channels, strikes the surfaces of the channels, where it undergoes two TIR's, and is reflected back through the surface by which it entered. However, by applying an appropriate voltage between the electrodes, the electrophoretic particles are moved to form a layer plating the surfaces of the channels and frustrating the TIR's. Thus the apparatus acts as a light modulator. Mossman et al., "New Reflective Color Display Technique Based on Total Internal Reflection and Subtractive Color Filtering", SID 01 Digest, page 1054 (Society for Information Display, June 2001) describes a similar system in which the light-transmissive member includes an array of subtractive color filters to provide a full color display. The same paper also describes the use of a polymeric film adjacent the light-transmitting member, this polymeric film being provided with grooves having an internal angle of 60° and running perpendicular to the grooves in the light-transmitting member, in order to concentrate incoming light into the light-transmitting member.

The systems described in the preceding paragraph (hereinafter for convenience referred to as the "Whitehead systems") have a number of problems, and this invention relates to improvements and modifications of such systems. More specifically, this invention is designed to address the following problems in Whitehead systems:

(a) non-uniform distribution of particles on the surfaces of the channels in the dark state of the system;

(b) settling of the electrophoretic particles under gravity; and (c) non-uniformity of electric field between the electrodes.

This invention also provides a modified Whitehead system in which the dark state of the device is produced by light scattering or absorption rather than total internal reflection.

SUMMARY OF INVENTION

The basic Whitehead system, as defined in claim 1 of the aforementioned U.S. Pat. No. 6,215,920 is an image display device comprising:

(a) a reflective sheet having a prismatic inward surface and an opposed outward surface;

(b) an electrophoretic medium contacting the prismatic surface;

(c) a plurality of particles suspended in the electrophoretic medium; and (d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface.

(For the avoidance of confusion, it should be noted that there is a serious error in the aforementioned claim 1 as printed. The printed claim states that the reflective sheet has an index of refraction $n_1$, the electrophoretic medium has an index of refraction $n_2$ and that $n_2$ is sufficiently larger than $n_1$ to produce the specified TIR. This must be wrong, since TIR occurs when light attempts to emerge from a medium of higher refractive index into one of lower refractive index. Furthermore, according to claim 2 of the same patent, the preferred range for $n_1$ is 2.1 to 2.4, and the preferred range for $n_2$ is 1.25 to 1.27. Accordingly, the above definition of the basic Whitehead system specifies that the electrophoretic medium has an index of refraction sufficiently smaller than the index of refraction of the reflective sheet to produce the specified TIR.)

In one aspect, this invention provides a Whitehead system in which the means for applying a voltage comprises a first electrode substantially conforming to the shape of the prismatic surface and a second electrode substantially conforming to the shape of the first electrode such that the gap between the first and second electrodes is of substantially constant width. This aspect of the invention may hereinafter be referred to as the "conforming rear electrode" embodiment.

In another aspect, this invention provides a Whitehead system in which the electrophoretic medium and the plurality of particles are contained within a plurality of capsules. This aspect of the invention may hereinafter be referred to as the "encapsulated" embodiment.

In another aspect, this invention provides a Whitehead system in which the electrophoretic medium comprises a viscosity modifier. This aspect of the invention may hereinafter be referred to as the "viscosity modifier" embodiment.

In another aspect, this invention provides a Whitehead system in which the particles bear a polymer coating. This aspect of the invention may hereinafter be referred to as the "polymer coated particles" embodiment.

In another aspect, this invention provides a Whitehead system in which the volume fraction of the particles in the electrophoretic medium is at least about 50 percent. This aspect of the invention may hereinafter be referred to as the "high volume fraction" embodiment.

In another aspect, this invention provides a Whitehead system in which at least some of the particles are attached to the reflective sheet by flexible filaments ("tethers"). This aspect of the invention may hereinafter be referred to as the "tethered particles" embodiment.

In another aspect, this invention provides a Whitehead system in which the plurality of particles vary in electrophoretic mobility, at least one of the particles having an electrophoretic mobility which is at least twice that of another of the particles. This aspect of the invention may hereinafter be referred to as the "varying electrophoretic mobility" embodiment.

In another aspect, this invention provides a Whitehead system in which the prismatic surface is provided with an electrode and a layer of a substantially insulating material having a low refractive index covering the electrode. This aspect of the invention may hereinafter be referred to as the "low refractive index layer" embodiment.

In another aspect, this invention provides a Whitehead system which comprises a rear support disposed on the opposed side of the electrophoretic medium from the reflective sheet, and a plurality of cross-walls extending from the reflective sheet to the rear support and separating the electrophoretic medium into a plurality of cells isolated from one another by the cross-walls. This aspect of the invention may hereinafter be referred to as the "cross-walls" embodiment.

In another aspect, this invention provides a modified Whitehead system in which the electrophoretic medium comprises first and second phases, the first phase wetting the prismatic surface while the second does not, whereby a layer of the first phase is formed covering and substantially conforming to the prismatic surface, the first phase having an index of refraction sufficiently smaller than the index of refraction of the reflective sheet that most of the light passing through the reflective sheet undergoes total internal reflection at the prismatic surface when the particles are not closely adjacent the prismatic surface. This aspect of the invention may hereinafter be referred to as the "immiscible phases" embodiment.

Finally, this invention provides a modified Whitehead system which contains the same basic integers as the original Whitehead system but does not rely upon frustration of TIR. This modified system, which may hereinafter be referred to as the "scattering/absorption" embodiment, comprises:

(a) a reflective sheet having a prismatic inward surface and an opposed outward surface;

(b) an electrophoretic medium contacting the prismatic surface;

(c) a plurality of particles suspended in the electrophoretic medium; and (d) means for applying a voltage across the electrophoretic medium to selectively move the particles closely adjacent the prismatic surface.

The particles comprise at least one light-scattering or light-absorptive center disposed within a light transmissive matrix, whereby, when the particles are disposed closely adjacent the prismatic surface, most of the light passing through the reflective sheet passes into the particles and is scattered or absorbed by the light-scattering or light-absorptive center.

DETAILED DESCRIPTION

As may been seen from the foregoing Summary of Invention, the present invention has numerous different aspects. Although these various aspects will for convenience and ease of understanding be described seriatim, it will readily be apparent to those skilled in the technology of electrophoretic displays that several aspects of the present invention may be incorporated into a single device. For example, an encapsulated device could also make use of the viscosity modifier, polymer coated particles and high volume fraction aspects of the invention.

Also, in view of the large number of aspects of the present invention, it is convenient to group the various aspects according to which of the aforementioned problems they are primarily designed to address, as follows:

Section A: Non-uniform Distribution of Particles

Figure 3:
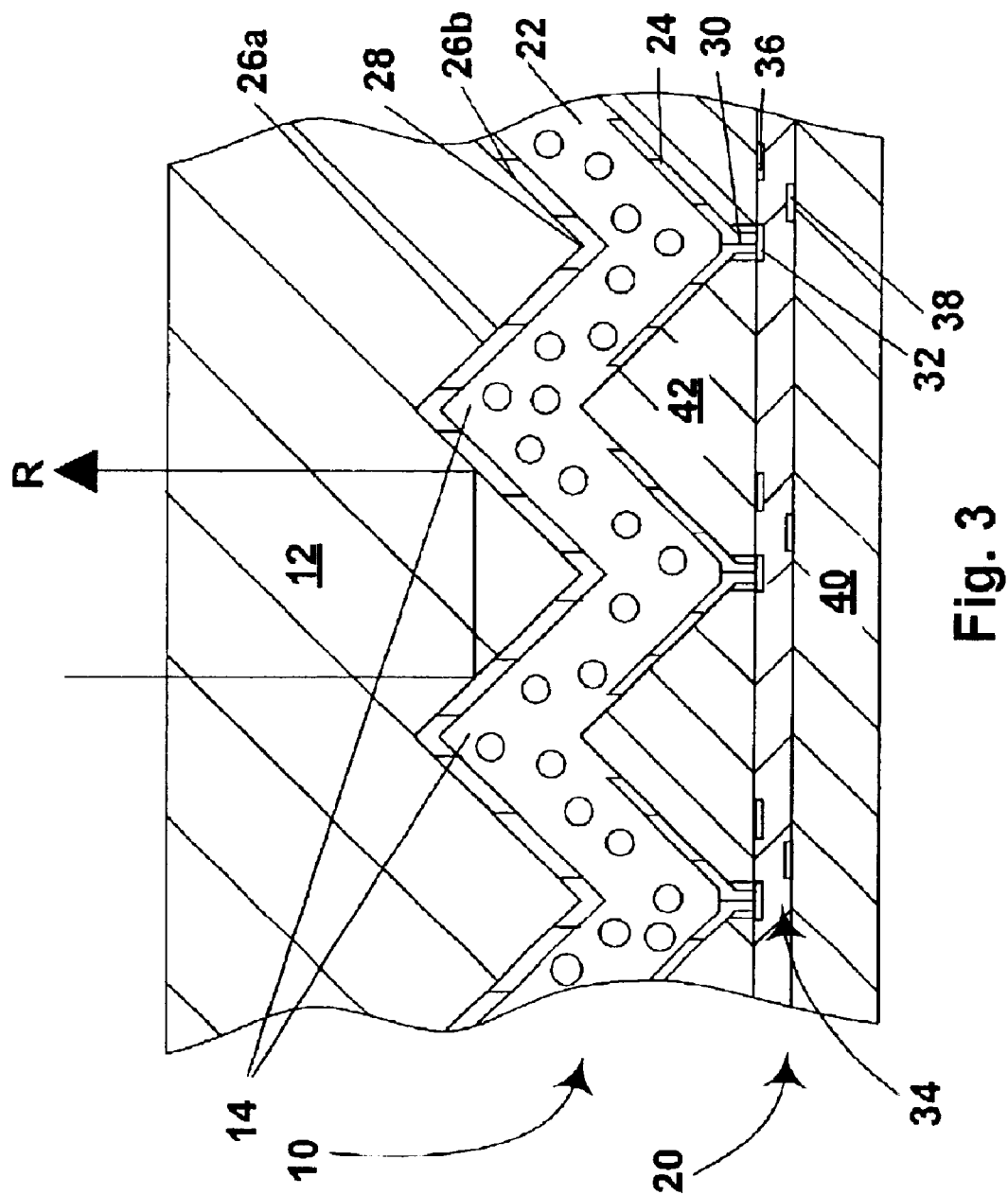
FIG. 3 is a schematic cross-section, similar to FIG. 1, through a conforming rear electrode image display device of the present invention

The original Whitehead system, as illustrated in FIG. 3 of the aforementioned U.S. Pat. No. 6,215,920, has a reflecting sheet having a planar outward surface (through which an observer views the display) and an inward surface having the form of a series of right triangular isosceles prisms, with the right-angled edges of these prisms being directed away from the outward surface, so as to provide two sets of inclined surfaces, both sets lying at 45° to the plane of the outward surface, but the two sets lying perpendicular to each other. Both sets of surfaces are covered by a transparent conductive layer which forms the front or "channel" electrode of the device. The rear electrode is provided on a planar surface lying parallel to the outward surface of the reflecting sheet. Thus, the distance between the two electrodes varies cyclically, in a saw-tooth manner, as one tranverses the triangular prisms.

As will readily be apparent to those skilled in the technology of electrophoretic systems, in this original Whitehead system, the cyclic variation in the distance between the channel and rear electrodes causes the electric field between these two electrodes to be highly non-uniform, and this non-uniform electric field is likely to lead to substantially non-uniform distribution of particles on the walls of the channels in the "dark" state in which TIR is intended to be frustrated. This non-uniform distribution may cause parts of the channel electrode not to be covered by particles, to that TIR does not occur at this non-covered parts, leading to an undesirably high dark state reflectance. Accordingly, if the particle distribution could be made more uniform, the contrast ratio between the dark and light states of the display could be improved.

It is believed (although the present invention is in no way limited by this belief) that in the Whitehead systems, when an electric field is applied across the electrodes to move the particles adjacent the channel electrode, the electrophoretic particles will initially concentrate on the ridges between the channels, since these are the areas of maximum field intensity, and that thereafter, as the electric field continues to be applied, the particles will tend to spread from these ridges on to the sloping sides of the channels. Accordingly, using electrophoretic particles with a range of mobilities, in accordance with the variable electrophoretic mobility aspect of the present invention, should improve the uniformity of distribution of the particles in the dark state, since the more mobile particles will already have traveled down the sides of the channels as the less mobile particles are still reaching the ridges. The electrophoretic mobilities of the particles may vary from about a two-fold to about a five-fold, or higher range, i.e., at least one of the particles should have an electrophoretic mobility which is at least about twice, and preferably at least about five times, that of another of the particles. Also, with or without using such a range of mobilities, it is important to control the duration of the period during which the electric field is applied to the electrodes (the duration of the "driving pulse") since too short a pulse will tend to leave the particles concentrated on the ridges, whereas too long a pulse will allow most particles to move into the "valleys" (the points furthest distant from the rear electrode) of the channels, in either case producing an undesirably non-uniform coverage of the channel surfaces. It is also advantageous to use electrophoretic particles with high charges since such highly charged particles, when in close proximity to one another on the surface of the channel electrode, will coulombically repel one another, and will thus tend to more uniformly distribute themselves over the channel electrode.

Another technique to increase the uniformity of particle distribution in the dark state is to physically tether the particles to the channel electrode, in accordance with the tethered particles aspect of the present invention. As described in U.S. Pat. No. 6,323,989 and the related International Application Publication No. WO 02/057843, electrophoretic systems may usefully be modified by tethering electrophoretic particles to each other or to a fixed electrode using polymeric chains or similar tethers. Although this patent and application primarily describe the use of such tethers with nano-electrophoretic particles having diameters typically of the order of 50 nm or less, the use of such tethers with larger electrophoretic particles in the Whitehead systems is practicable because of the very short distance which the electrophoretic particles need to move between the dark and light states. Because frustration of TIR relies upon the electrophoretic particles disrupting the evanescent wave, which penetrates only about 100–250 nm beyond the surface at which the reflection is notionally taking place, particle movement of about 500 nm is sufficient to cause a shift between the light and dark states of the system, and movements of this magnitude are practicable with tethered particles. If tethered particles are used, close attention should be paid to the suspending liquid of the electrophoretic medium, since solvation of the tether is an important factor in controlling the conformation of the tether and hence the movement of the tethered particle relative to the electrode, and the degree of solvation can be greatly affected by the composition of the suspending liquid.

Figure 1:
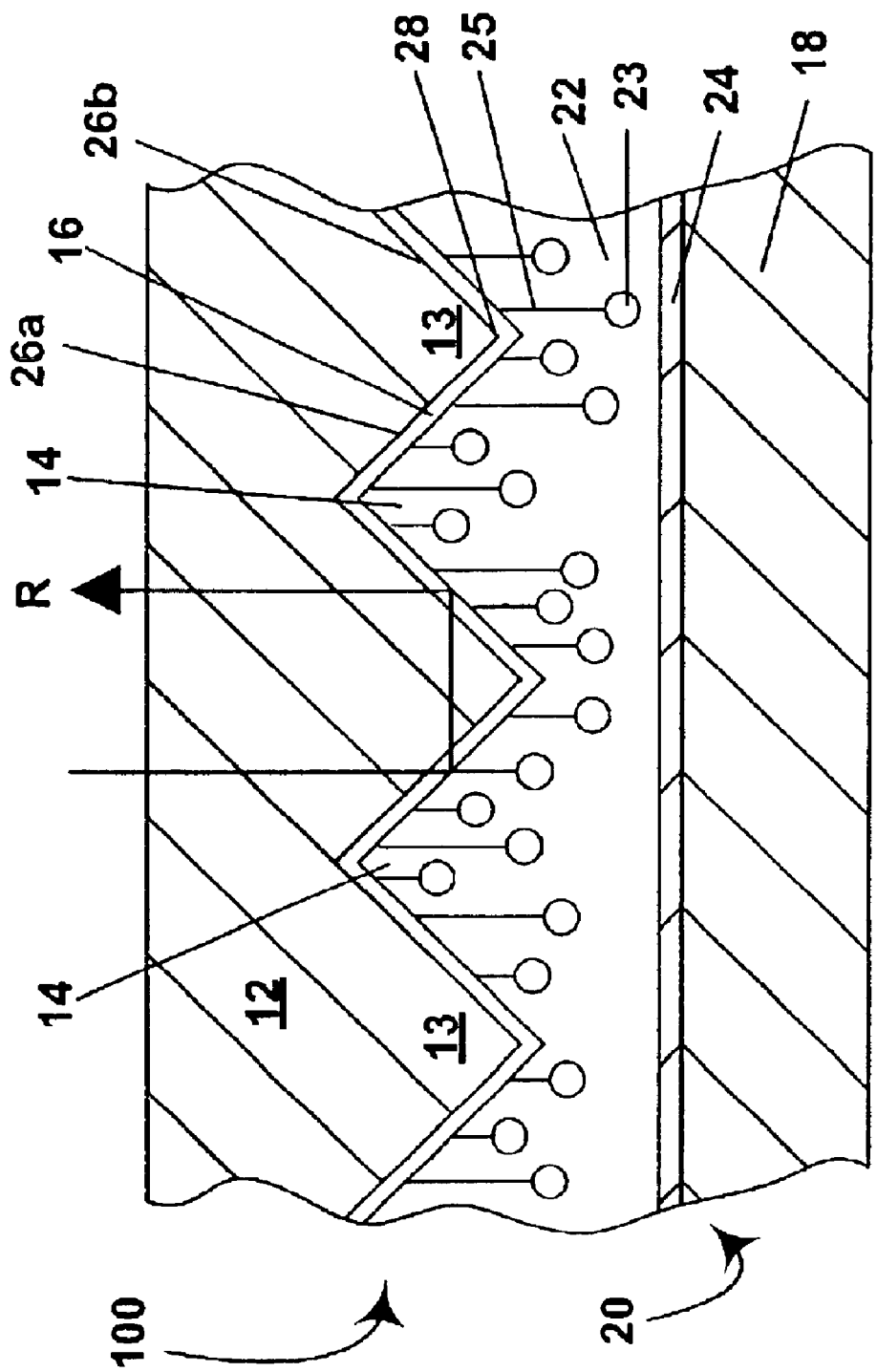
FIG. 1 of the accompanyings drawings is a schematic cross-section through a tethered particles image display device of the present invention.

A schematic cross-section through a tethered particles image display device of the present invention is shown in FIG. 1. This device, generally designated 100, comprises a reflecting sheet (better described as a light transmitting member) 12 having a planar outward surface (the top surface as illustrated in FIG. 1; in actual use, this outward surface typically lies in a vertical plane, so that the plane of FIG. 1 is horizontal) through which an observer views the display. The reflecting sheet 12 has an inward surface having the form of a series of right triangular isosceles prisms 13, the right-angled edges 28 of which are directed away from the outward surface, so as to provide two sets of inclined surfaces 26a, 26b, each set lying at 45° to the plane of the outward surface but lying perpendicular to the other set, thus leaving a plurality of channels 14. The surfaces 26a, 26b are inclined so that, as illustrated by ray R in FIG. 1, light entering the reflecting sheet 12 perpendicular to the outward surface thereof undergoes two TIR's from an adjacent pair of surfaces 26a, 26b (or more accurately, from the surfaces of a front electrode 16—see below—overlying these surfaces) and leaves the outward surface of the reflecting sheet 12 in exactly the reverse direction from which it entered.

The surfaces 26a, 26b are covered with a layer of indium tin oxide (ITO—other conductive materials, including conductive polymers may alternatively be used) forming a common front or channel electrode 16.

The device 100 further comprises a backplane (generally designated 20) comprising a support member 18 carrying on its upper surface a second or rear electrode 24. It should be noted that since this rear electrode 24 is not visible to an observer viewing the display, it does not need to be transparent, unlike the front electrode 16. Thus, conveniently the rear electrode 24 is formed from a metal. Also, although only a single rear electrode 24 is shown in FIG. 1 (it being assumed that the whole area shown in FIG. 1 is part of a single pixel of the display 100), the rear electrode may be patterned in any desired manner to form individual pixel electrodes; in particular, the rear electrode 24 may be patterned into pixels each of which lies directly opposite one pair of adjacent surfaces 26a and 26b separated by an edge 28; note that, because of the way in which incident light undergoes two TIR's from the surfaces 26a and 26b, a single pixel must comprise at least one pair of adjacent surfaces 26a and 26b separated by an edge 28. In addition, in any practical display there will be multiple rows of rear electrodes 24.

Between the electrodes 16 and 24 is disposed an electrophoretic medium 22 having a refractive index which is sufficiently smaller than the refractive index of the reflecting sheet 12 to permit the TIR's previously mentioned to take place. Suspended within the electrophoretic medium 22 are a plurality of electrically charged particles 23, each of which is connected to the front electrode 16 by an individual flexible filament or tether 25. The tethers 25 can vary in length, and the number of particles 23 is greatly reduced in FIG. 1 for ease of comprehension; in practice, the number of particles 23 is made somewhat greater than that required to form a continuous layer covering the front electrode 16 in order to ensure that when an electric field is applied to bring the particles 23 adjacent the front electrode 16, substantial complete coverage of the electrode 16 by the particles 23 will be achieved, since even a small area of the electrode 16 not covered by the particles 23 can have a substantial adverse effect on the dark state, and hence the contrast ratio, of the display 100.

FIG. 1 illustrates the "light" state of the display 100, in which light incident on the outward surface of the reflecting sheet 12 undergoes a double TIR and is returned out through the outward surface in the manner already described. If, however, an electric field of appropriate polarity is applied between the electrodes 16 and 24, the particles 23 will move closely adjacent the front electrode 16. The particles 23 are chosen to have a refractive index greater than that of the electrophoretic medium 22, such that when the particles lie closely adjacent the front electrode 16, TIR is disrupted, and light incident on the outward surface of the reflecting sheet 12 is no longer returned out through the outward surface, so that the device 12 appears dark.

The limited movement needed to switch between the light and dark states in Whitehead systems also has interesting implications as regards the design of electrophoretic particles to be used in these systems. As a first approximation, the layer of electrophoretic particles covering the channel electrode in the dark state of such a system may be modeled as a two-dimensional close-packed array of spheres formed on a flat surface. Such a close-packed array leaves voids immediately adjacent the surface, these voids having a form similar to that of a frustum of a triangular pyramid, with the height of this frustum equal to the radius of the spheres. If this radius is significantly larger than the distance by which the evanescent wave penetrates the flat surface, a proportion of the evanescent wavefront will lie within the voids and hence with not be disrupted by the particles, and the same proportion of the light striking the surface will undergo TIR. (It is of course appreciated that the intensity of the evanescent wave decreases exponentially with distance from the surface so that there is, strictly speaking, no wavefront at a specific distance from the surface. Nevertheless, for present qualitative purposes, it is convenient to consider an evanescent wavefront extending parallel to the flat surface at a distance such that the intensity of the wave at the wavefront is some arbitrary fraction, say 1/e, of its intensity at the surface.) Accordingly, the diameter of the particles will affect the proportion of the TIR which is frustrated. In general, it appears that for spherical particles, a diameter of about 200–300 nm (in accordance with one part of the controlled shape particles aspect of the present invention) should be most successful in frustrating TIR.

However, in accordance with another part of the controlled shape particles aspect of the present invention, and from the foregoing discussion, it also appears that spherical or near spherical particles are not the optimum shape for frustrating TIR. Essentially, the ideal situation for disrupting the evanescent wave, and thus frustrating TIR, is to form a continuous layer of material at the evanescent wavefront. While it may be impossible to satisfy this condition in practice, to approach as closely as possible to this condition requires that there be as few gaps as possible in the layer of particles at the relevant distance. To the extent that small particles can assist in filling voids between larger particles, use of a mixture of electrophoretic particles of differing sizes may be advantageous in leaving as few voids as possible. However, formation of an almost-continuous layer is best achieved by using particles which have substantially greater dimensions in directions parallel to the surface than perpendicular to it. Accordingly, using particles in the form of flat plates or prisms or oblate ellipsoids or spheroids should give better frustration of TIR than using spherical particles. The flat plates or prisms desirably have an aspect ratio (the ratio of average diameter to thickness) of at least about 3:1. Specifically, aluminum flakes having an aspect ratio of about 10:1 and an effective major diameter of about 5–15 $\mu$m are available commercially and should be very suitable for use in the Whitehead systems. Similar flakes of other metals may also be employed.

In the Whitehead systems, the structure of the channel walls, and particularly the optical properties thereof, are of crucial importance in promoting effective frustration of TIR and hence good contrast between the light and dark states of the system. For example, the channel walls could use a conducting polymer as the electrode in place of indium tin oxide (ITO). Alternatively, in accordance with the low refractive index layer aspect of the present invention, the optical properties of the channel walls might be modified by using a layer of ITO (or similar conductive material) which is thicker than that required to form a sufficiently conductive electrode, or by coating a low refractive index material, such as magnesium fluoride over the ITO. Note that the use of a low refractive index, or indeed other material over the electrode in this manner may be useful in increasing the range of materials which can be used to form the electrodes. Because of the very low refractive index which is required of the electrophoretic medium in the Whitehead systems, the choice of electrophoretic medium is in practice restricted to a small number of highly fluorinated liquids, and certain conductive materials otherwise suitable for use as electrodes in the Whitehead systems, especially certain conductive polymers, may be adversely affected by long term contact with such highly fluorinated liquids. Covering the electrode with a layer on non-conducting material widens the range of conductive materials which can be used with such liquids. The current required to switch a Whitehead system is sufficiently low that the presence of a thin layer of a material normally regarded as an insulator over one or both of the electrodes does not have a substantial impact on the operation of the system.

Section B: Settling of Particles

One problem which the Whitehead systems share with many other prior electrophoretic systems is settling of the electrophoretic particles under gravity so that after long usage the particles occupy only the lower parts of the channels. Note that since, in the Whitehead systems, particles are free to move between channels as they are moved from the channel electrode to the back electrode, then in the reverse direction, the systems will suffer from particle settling if the channels lie at an angle to the horizontal, and in most display applications it is impossible to keep the channels horizontal when the display is in use. Indeed, the Whitehead systems are more susceptible to particle settling than most other electrophoretic systems since such settling is a function of the difference between the densities of the electrophoretic particles and the electrophoretic medium, and the Whitehead systems are required to use a low density fluorocarbon electrophoretic medium. (TIR at the walls of the 90° internal angle channels in the Whitehead system requires that the ratio between refractive indices of the electrophoretic medium and the material in which the channels are formed be at least $\sqrt{2}=1.414$, and given the refractive indices of the polymers useful for forming the channels, the electrophoretic medium needs to have a refractive index below about 1.3. The only commercially available materials with such a low refractive index and the other properties required for a electrophoretic medium are highly fluorinated alkanes, and such materials have substantially lower densities than the hydrocarbons or chlorinated hydrocarbons used in most prior art electrophoretic displays.) Whitehead and his co-workers appear to recognize this settling problem, since in FIGS. 4A, 4B, 5A and 5B of the aforementioned U.S. Pat. No. 6,215,920, they describe embodiments of the Whitehead system which use "interrupted" channels which are inclined at a small angle to the vertical and which are interrupted at intervals by a horizontal step.

Numerous patents and applications assigned to or in the names of the Massachusetts Institute of Technology and E Ink Corporation have recently been published describing encapsulated electrophoretic media. Such encapsulated media comprise numerous small capsules, each of which itself comprises an internal phase containing electrophoretically-mobile particles suspended in an electrophoretic medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,241,921; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786 and 6,413,790; U.S. Patent Application Publication Nos. 2001-0045934; 2002-0018042; 2002-0019081; 2002-0021270; 2002-0053900; 2002-0060321; 2002-0063661; 2002-0063677; and 2002-0090980; and International Applications Publication Nos. WO 97/04398; WO 98/03896; WO 98/19208; WO 98/41898; WO 98/41899; WO 99/10767; WO 99/10768; WO 99/10769; WO 99/47970; WO 99/53371; WO 99/53373; WO 99/56171; WO 99/59101; WO 99/67678; WO 00/03349; WO 00/03291; WO 00/05704; WO 00/20921; WO 00/20922; WO 00/20923; WO 00/26761; WO 00/36465; WO 00/36560; WO 00/36666; WO 00/38000; WO 00/38001; WO 00/59625; WO 00/60410; WO 00/67110; WO 00/67327 WO 01/02899; WO 01/07691; WO 01/08241; WO 01/08242; WO 01/17029; WO 01/17040; WO 01/17041; WO 01/80287 and WO 02/07216. As described in these patents and applications, the settling problem in electrophoretic displays can be eliminated by encapsulating the electrophoretic particles and electrophoretic medium within a plurality of microcapsules, and such microencapsulated electrophoretic media can also be used in the Whitehead systems, in accordance with the encapsulated aspect of the present invention, since the walls of such microcapsules are sufficiently flexible to permit the microcapsules to conform to the shape of the channels; cf. U.S. Pat. Nos. 6,130,774 and 6,172,798, which describe microcapsules conformed to the shape of triangular grooves or channels, and U.S. Pat. Nos. 6,067,185 and 6,392,785, which describes electrophoretic media containing non-spherical microcapsules. However, because of the optical requirements for TIR, some modification of the microcapsules described in these patents and applications are desirable for microcapsules used in the Whitehead systems.

(When applying the teachings of the above E Ink and MIT patents and applications to the Whitehead system, it should be noted that the nomenclature used for certain parts of the electrophoretic system in these patents and applications is not consistent with that used herein and in the aforementioned U.S. Pat. No. 6,215,920. In deference to the aforementioned U.S. Pat. No. 6,215,920, the liquid through which the electrophoretic particles move is herein referred to as the "electrophoretic medium"; in the above E Ink and MIT patents and applications, this liquid is referred to as the "suspending fluid", the term "electrophoretic medium" being used for the complete electro-optic layer comprising this liquid, the electrophoretic particles, the capsule wall and (where present) the binder surrounding the capsules.)

In a Whitehead system using microcapsules, the channel electrode will be lined with a conforming film of the microcapsule wall material, and obviously the electrophoretic particles at all times remain separated from the channel electrode by the thickness of the microcapsule wall. It is necessary to ensure electrophoretic particles in contact with the internal surface of the microcapsule wall are sufficiently close to the channel surface to disrupt the evanescent wave (allowing, of course, for the effect of the refractive index of the microcapsule wall material on the depth of penetration of the evanescent wave) and thus frustrate TIR. There are two approaches to this problem, which may be used separately or in combination. The first approach is to use a microcapsule wall material which has a refractive index which does not differ from the refractive index of the reflective sheet my more than about 0.3, and preferably not more than about 0.2; for example, certain methacrylate polymers have refractive indices within the desired range. In this case, the microcapsule becomes, optically, part of the material forming the channel, and the interface at which TIR occurs is that between the microcapsule wall and the electrophoretic medium, and the electrophoretic particles can thus lie immediately adjacent this interface. The second approach uses a very thin microcapsule wall (less than 200, and preferably less than 100 nm) to ensure that the evanescent wave penetrates into the electrophoretic medium. It may also be desirable to increase the viscosity of the electrophoretic medium using a viscosity modifier, and the preferred viscosity modifiers for this purpose are the same as those described below for viscosity modifier devices of the present invention.

Figure 2:
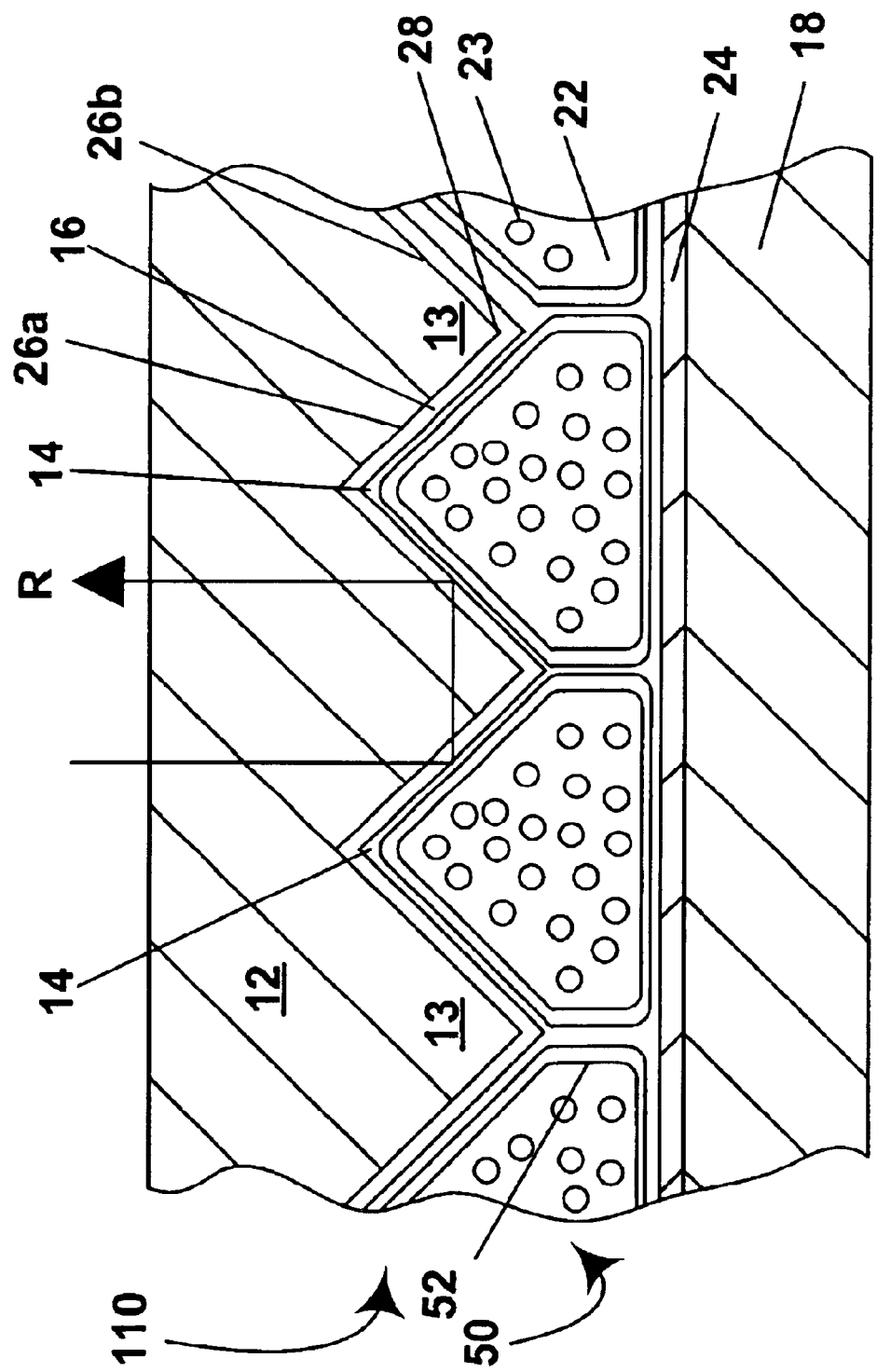
FIG. 2 is a schematic cross-section, similar to FIG. 1, through an encapsulated image display device of the present invention.

FIG. 2 of the accompanying drawings is a schematic cross-section through an encapsulated device of the present invention. This device (generally designated 110) has a reflecting sheet 12, channels 14, a support member 18 and electrodes 16 and 24 all of which are identical to the corresponding integers shown in FIG. 1. However, in the device 110 the electrophoretic medium 22 and the particles 23 are confined within a plurality of capsules (generally designated 50) each defined by a capsule wall 52. These capsule walls 52 are deformable, so that when the capsules are deposited upon the reflecting sheet 12 and the support 18 thereafter placed on top of the capsules 52 to form the complete device 110. the capsules 52 deform to substantially fill the space between the sheet 12 and the support 18, assuming the essentially pentagonal prismatic form shown in FIG. 2.

Another technique for dealing with the settling problem is to increase the viscosity of and/or gel the electrophoretic medium, for example by dissolving a polymer in the suspending fluid cf. application Ser. No. 10/063,236, filed Apr. 2, 2002 (Publication No. 2002/0180687) and the corresponding International Application No. PCT/US02/10267 (Publication No. WO 02/079869), thus employing the viscosity modifier aspect of the present invention. Although such an increase in viscosity will decrease the mobility of the electrophoretic particles, and hence the switching time (the time required to switch the display between its dark and light states) will be increased, a modest increase in switching time can be tolerated since the switching times of Whitehead systems can be made very low, because of the very short distances which the particles need to move between the light and dark states. (See also the discussion below regarding the use of shaped back electrodes, which offer the possibility of some countervailing reduction in switching time.) Furthermore, the aforementioned 2002/0180687 shows that if the viscosity modifier comprises a polymer having an intrinsic viscosity of $\eta$ in the electrophoretic medium and being substantially free from ionic or ionizable groups in the electrophoretic medium, the polymer being present in the electrophoretic medium in a concentration of from about 0.5 $\eta^{-1}$ to about 2.0 $\eta^{-1}$, very substantial increases in the bistability of the device can be produced at the expense of only a modest increase in switching time. A preferred polymer for use as a viscosity modifier is polyisobutylene.

A further technique for reducing, or at least deferring, the effects of particle settling is to reduce the difference in density between the electrophoretic particles and the electrophoretic medium; this approach also widens the range of materials which can be used to used in such electrophoretic particles. The density of many types of electrophoretic particles can be reduced by attaching polymer chains thereto in the various ways described in application Ser. No. 10/063,803, filed May 15, 2002 (Publication No. 2002/0185378), and the corresponding International Application No. PCT/US02/15337 (Publication No. WO 02/093246), in accordance with the polymer coated particles aspect of the present invention. For example the aforementioned U.S. Pat. No. 6,215,920 recommends using either "dyed or otherwise scattering/absorptive silica particles" or "dyed or otherwise scattering/absorptive latex particles" in Whitehead systems, apparently because the low specific gravities of these materials (given as about 1.44 for silica and about 1.5 for latex particles) are tolerable for use with the low specific gravity, low viscosity fluorinated alkane electrophoretic media with which they are intended to be used. Carbon black would appear a more suitable material for the electrophoretic particles but the density of untreated carbon black may be too high to be useful in Whitehead systems. By attaching polymer chains to the carbon black, its density could be reduced sufficiently to render it useful in such systems. It is recommended that the carbon black particles have from about 1. to about 25 per cent by weight of the carbon black of the polymer chemically bonded to, or cross-linked around, the carbon black particles.

Attachment of polymer to the electrophoretic particles has uses other than altering the density thereof. For example, such polymer attachment may be useful in increasing or decreasing the effective refractive index of the particles. A high refractive index particle may be useful for increasing optical coupling between the particle and the surface of the channel electrode, thus promoting efficient frustration of TIR, and for this purpose the polymer coating may contain repeating units derived from arsenic-containing monomers. If a low refractive index particle is desired, the polymer coating may contain repeating units derived from highly fluorinated monomers.

A different approach to the settling problem is to increase the volume fraction of the electrophoretic particles in the electrophoretic medium, in accordance with the high volume fraction aspect of the present invention. As already noted, to frustrate TIR it is necessary for the electrophoretic particles to be within about 250 nm of the channel surface. Conversely, a spacing of 500 nm or greater between the channel surface and the particles will permit full TIR. If the volume fraction of the electrophoretic particles in the electrophoretic medium is increased above about 50 percent, and perhaps above 70 percent (depending upon factors such as the size distribution and shape of the particles), the particles will be unable to undergo substantial settling, since they almost "fill" the suspending fluid, but when an electric field of appropriate polarity to cause a "white" state of the display is applied between the electrodes, a narrow gap, conforming to the shape of the channel surface, will be cleared of the electrophoretic particles, thus permitting TIR to occur.

Alternatively, in accordance with the cross-walls aspect of the present invention, to reduce the settling problem in the Whitehead systems which do not use a microencapsulated electrophoretic medium, it is advantageous to interrupt the voids containing the electrophoretic medium at intervals with cross-walls at regular intervals. In the systems shown in FIG. 1 or 2, such cross-walls could be provided by the patterning of a photoresist layer or by the molding of the member 12. Other techniques for providing cross-walls in other embodiments of the inventions described above will readily be apparent to those skilled in the relevant art.

Section C: Non-uniformity of Electric Field

In accordance with the conforming rear electrode aspect of the present invention, the Whitehead systems can usefully be modified by changes in the form of the rear electrode. As already mentioned, one serious problem in such systems is the non-uniformity of the electric field between the planar rear electrode and the non-planar channel electrode. This problem is best overcome by making the rear electrode substantially conform of the channel electrode so that a gap of substantially constant width (though having a zigzag form as seen in cross-section) is left between the electrodes. The electric field between such electrodes, except adjacent in the ridges and valleys, will lie perpendicular to the electrode surfaces.

The shaping of the rear electrode can be effected in various ways. The material supporting the back electrode could be a polymer and the channels necessary to provide the desired shape of the rear electrode formed in this polymer and coated with a conductor in the same way as for the channel electrode. To provide proper alignment between the two electrodes, it may be desirable to provide projections on one of the electrode-bearing sheets, with corresponding recesses on the other. Alternatively, the rear electrode itself could be shaped to provide the appropriate surface. For example, a layer of metal could be deposited on a substrate and shaped, possibly by electrochemical machining, to provide the necessary channels in the rear electrode. A further possibility is shown in FIG. 3 of the accompanying drawings, which illustrates a system using a rear electrode driven by an active matrix array of thin film transistors having the "buried transistor" architecture of the type described in application Ser. No. 09/650,620 and the corresponding International Application Publication No. WO 01/17029. As shown in FIG. 3, this system (generally designated 10) has a reflecting sheet 12, channels 14, a support member 18 and electrodes 16 and 24 all of which are identical to the corresponding integers shown in FIG. 1.

The backplane (generally designated 20) of the system 10 closely conforms to the shape of the channels 14 so that only a thin layer of electrophoretic medium 22 is present in the system. The backplane 20 is provided with a series of rear electrodes 24 each of which defines one pixel of the display; note that, because of the way in which incident light undergoes two TIR's from the walls of two adjacent channels, a pixel comprises the channel surfaces, denoted 26a and 26b, on opposed sides of a ridge 28 between two adjacent channels 14. Each electrode 24 is V-shaped in cross-section, and is connected by means of a via 30 to the source 32 of a thin film bottom gate transistor (generally designated 34) having a drain 36 and a gate 38, all formed on a substrate 40. (The row and column electrodes used to apply voltages to the transistor electrodes are omitted from the Figure for simplicity. since these row and column electrodes can be of conventional construction.) A shaped layer of dielectric 42 supports the electrodes 24 and insulates them from the drains 36.

The backplane 20 can readily be formed by conventional photolithographic and metallization techniques. After the transistors 34 have been formed, the whole backplane is covered with a layer of photoresist, which is then patterned to form the dielectric layer 42 and the apertures in which the vias 30 will be formed. Metallization and patterning can then be used to form the electrodes 24 and the vias 30.

Instead of using a shaped backplane to control the movement of the electrophoretic particles in the Whitehead systems, particle movement could be controlled by using a mixture of two immiscible liquids as the suspending fluid. If the suspending fluid comprises two immiscible liquids, one of which wets the channel electrode material and the other does not (it being assumed that the rear electrode is formed of a different material which is not wetted by the first liquid) and the proportions of the two liquids are adjusted appropriately, the "wetting" liquid will form a thin layer adjacent and conforming to the channel electrode. The properties of the electrophoretic particles can be adjusted so that the particles have a lower free energy when dispersed in one of the liquid than in the other. Accordingly, the particles may only move within the layer of the wetting liquid. Alternatively, movement of the particles between the two liquids could be used to provide a threshold for switching of the system, thus opening up the possibility of passive matrix driving of the system.

Finally, the Whitehead systems may be modified by using particles containing multiple absorption or scattering centers. Consider a "raisin bun" particle in which a plurality of small light-scattering and/or light-absorptive centers (formed, for example, from carbon black) are distributed within a light-transmissive matrix. If such particles are present in a Whitehead system adjacent the surface at which TIR would otherwise occur, and the refractive index of the matrix is not too dissimilar to that of the material forming the surface, the light reaching the surface will enter the matrix and will be scattered and/or absorbed by the various centers, so that essentially none of the light emerging from the surface re-enters that surface. The optical effect of the particle will thus be identical to frustrated TIR, although achieved by a different mechanism. This type of particle permits a wider choice of materials to be used in Whitehead systems.

It will be apparent to those skilled in the technology of electrophoretic displays that numerous changes and modifications can be made in the preferred embodiments of the invention described above without departing from scope of the invention. Accordingly, the foregoing description is to be construed in an illustrative and not in a limitative sense, the scope of the invention being defined solely by the appended claims.

What is claimed is:

1. An image display device comprising:
   (a) a reflective sheet having a prismatic inward surface and an opposed outward surface;
   (b) an electrophoretic medium contacting the prismatic surface;
   (c) a plurality of particles suspended in the electrophoretic medium; and
   (d) means for applying a voltage across the electrophoretic medium to selectively move the particles closely adjacent the prismatic surface to frustrate total internal reflection at the prismatic surface of light rays passing through the reflective sheet,
   the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface,
   wherein the means for applying a voltage comprises a first electrode substantially conforming to the shape of the prismatic surface and a second electrode substantially conforming to the shape of the first electrode such that the gap between the first and second electrodes is of substantially constant width.

2. An image display device according to claim 1 wherein the first electrode comprises a layer of conductive material disposed on the prismatic surface.

3. An image display device according to claim 1 further comprising a rear support disposed on the opposed side of the electrophoretic medium from the reflective sheet, the rear support having a rear prismatic surface substantially conforming to the form of the prismatic surface on the reflective sheet, the second electrode being disposed on the rear prismatic surface.

4. An image display device according to claim 1 wherein the prismatic inward surface has the form of the surface of a plurality of triangular prisms, each having a ridge and first and second surfaces, the first and second surfaces lying on opposed sides of the ridge and being of opposite inclination, the device having a plurality of second electrodes each associated with one of the triangular prisms, each second electrode having a first section extending substantially parallel to the first surface of its associated prism and a second surface extending substantially parallel to the second surface of its associated prism, the first and second sections of each individual second electrode both being connected to a single conductor.

5. An image display device according to claim 4 further comprising a rear support disposed on the opposed side of the electrophoretic medium from the reflective sheet and carrying the second electrodes, the single conductor having the form of a via extending through the rear support.

6. An image display device according to claim 5 further comprising a transistor connected to the via.

7. An image display device comprising:
   (a) a reflective sheet having a prismatic inward surface and an opposed outward surface;
   (b) a support member disposed adjacent the prismatic surface so as to leave a plurality of channels between the prismatic surface and the support member;
   (c) an electrophoretic medium contacting the prismatic surface and disposed between the prismatic surface and the support member;
   (d) a plurality of particles suspended in the electrophoretic medium; and
   (e) means for applying a voltage across the electrophoretic medium to selectively move the particles closely adjacent the prismatic surface to frustrate total internal reflection at the prismatic surface of light rays passing through the reflective sheet,
   the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the electrophoretic medium and the plurality of particles are contained within a plurality of capsules disposed within the plurality of channels.

8. An image display device according to claim 7 wherein the walls of the capsules have a refractive index which does not differ from the refractive index of the reflective sheet by more than about 0.3.

9. An image display device according to claim 8 wherein the walls of the capsules have a refractive index which does not differ from the refractive index of the reflective sheet by more than about 0.2.

10. An image display device according to claim 7 wherein the walls of the capsules have a thickness not greater than about 200 nm.

11. An image display device according to claim 7 wherein the walls of the capsules have a thickness not greater than about 100 nm.

12. An image display device according to claim 7 wherein the electrophoretic medium comprises a viscosity modifier.

13. An image display device according to claim 12 wherein the viscosity modifier comprises a polymer having an instrinsic viscosity of $\eta$ in the electrophoretic medium and being substantially free from ionic or ionizable groups in the electrophoretic medium, the polymer being present in the electrophoretic medium in a concentration of from about 0.5 $\eta^{-1}$ to about 2.0 $\eta^{-1}$.

14. An image display device according to claim 12 wherein the viscosity modifier comprises a polyisobutylene.

15. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the electrophoretic medium comprises a viscosity modifier.

16. An image display device according to claim 15 wherein the viscosity modifier comprises a polymer having an instrinsic viscosity of $\eta$ in the electrophoretic medium and being substantially free from ionic or ionizable groups in the electrophoretic medium, the polymer being present in the electrophoretic medium in a concentration of from about 0.5 $\eta^{-1}$ to about 2.0 $\eta^{-1}$.

17. An image display device according to claim 15 wherein the viscosity modifier comprises a polyisobutylene.

18. An image display device according to claim 15 wherein the viscosity modifier gels the electrophoretic medium.

19. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the particles comprise carbon black bearing a polymer coating.

20. An image display device according to claim 19 wherein the carbon black particles have from about 1 to about 25 percent by weight of the carbon black of the polymer chemically bonded to, or cross-linked around, the carbon black particles.

21. An image display device according to claim 19 wherein the polymer coating comprises at least one arsenic-containing monomer.

22. An image display device according to claim 19 wherein the polymer coating comprises at least one fluorinated monomer.

23. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the volume fraction of the particles in the electrophoretic medium is at least about 50 percent.

24. An image display device according to claim 23 wherein the volume fraction of the particles in the electrophoretic medium is at least about 70 per cent.

25. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein at least some of the plurality of particles are attached to the reflective sheet by flexible filaments.

26. An image display device according to claim 25 wherein the flexible filaments are formed of a material which is solvated by the electrophoretic medium.

27. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the plurality of particles vary in electrophoretic mobility, at least one of the particles having an electrophoretic mobility which is at least twice that of another of the particles.

28. An image display device according to claim 27 wherein at least one of the particles has an electrophoretic mobility which is at least five times that of another of the particles.

29. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the plurality of particles are selected from substantially spherical particles having diameters in the range of about 200 to about 300 nm, oblate ellipsoids and spheroids, and flat plates and prisms having an aspect ratio of at least about 3:1.

30. An image display device according to claim 29 wherein the plurality of particles are selected from metal flakes having an aspect ratio of at least about 5:1.

31. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface, wherein the prismatic surface is provided with an electrode and a layer of a substantially insulating material having a low refractive index covering the electrode.

32. An image display device according to claim 31 wherein the low refractive index material comprises magnesium fluoride.

33. An image display device comprising:
(a) a reflective sheet having a prismatic inward surface and an opposed outward surface;
(b) an electrophoretic medium contacting the prismatic surface;
(c) a plurality of particles suspended in the electrophoretic medium;
(d) means for applying a voltage across the electrophoretic medium to selectively move the particles closely adjacent the prismatic surface to frustrate total internal reflection at the prismatic surface of light rays passing through the reflective sheet;
(e) a rear support disposed on the opposed side of the electrophoretic medium from the reflective sheet; and
(f) a plurality of cross-walls extending from the reflective sheet to the rear support and separating the electrophoretic medium into a plurality of cells isolated from one another by the cross-walls, the electrophoretic medium having an index of refraction sufficiently smaller than the index of refraction of the reflective sheet that most of the light passing through the reflective sheet undergoes total internal reflection at the prismatic surface when the particles are not closely adjacent the prismatic surface.

34. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface to frustrate total internal reflection at the prismatic surface of light rays passing through the reflective sheet, the electrophoretic medium comprising first and second phases, the first phase wetting the prismatic surface while the second does not, whereby a layer of the first phase is formed covering and substantially conforming to the prismatic surface, the first phase having an index of refraction sufficiently smaller than the index of refraction of the reflective sheet that most of the light passing through the reflective sheet undergoes total internal reflection at the prismatic surface when the particles are not closely adjacent the prismatic surface.

35. An image display device according to claim 34 wherein the particles only move within the first phase.

36. An image display device according to claim 34 wherein the particles move between two phases but the free energy of the particles in the second phase differs from their free energy in the first phase, such that movement of the particles between the two phases provides a threshold for switching of the device.

37. An image display device comprising:
(a) a reflective sheet having a prismatic inward surface and an opposed outward surface;
(b) an electrophoretic medium contacting the prismatic surface;
(c) a plurality of particles suspended in the electrophoretic medium; and
(d) means for applying a voltage across the electrophoretic medium to selectively move the particles closely adjacent the prismatic surface,
wherein the particles comprise at least one light-scattering or light-absorptive center disposed within a light transmissive matrix, whereby, when the particles are disposed closely adjacent the prismatic surface, most of the light passing through the reflective sheet passes into the particles and is scattered or absorbed by the light-scattering or light-absorptive center.

* * * * *